(12) United States Patent
Himmele

(10) Patent No.: US 7,097,300 B2
(45) Date of Patent: *Aug. 29, 2006

(54) SPORTS BINOCULAR ASSEMBLY

(76) Inventor: Tristram Himmele, 3543 S. Ocean Blvd. #113, South Palm Beach, FL (US) 33480

( * ) Notice: Subject to any disclaimer, the term of this patent is extended or adjusted under 35 U.S.C. 154(b) by 0 days.

This patent is subject to a terminal disclaimer.

(21) Appl. No.: 10/968,206

(22) Filed: Oct. 19, 2004

(65) Prior Publication Data

US 2005/0046791 A1    Mar. 3, 2005

Related U.S. Application Data

(63) Continuation of application No. 10/868,686, filed on Jun. 15, 2004, now Pat. No. 7,031,068, which is a continuation-in-part of application No. 10/633,936, filed on Aug. 4, 2003, now abandoned, which is a continuation-in-part of application No. 10/117,989, filed on Apr. 6, 2002, now Pat. No. 6,614,603, which is a continuation-in-part of application No. 09/523,213, filed on Mar. 10, 2000, now Pat. No. 6,369,958.

(51) Int. Cl.
    *G02C 1/00* (2006.01)
(52) U.S. Cl. ............... 351/158; 359/409; 381/374; 381/379
(58) Field of Classification Search ............... 351/158; 359/407–410; 381/374–383
See application file for complete search history.

(56) References Cited

U.S. PATENT DOCUMENTS

| | | | |
|---|---|---|---|
| 2,649,019 A | 8/1953 | Hartline | 88/36 |
| 2,986,696 A | 6/1961 | Muncheryan | 88/41 |
| 3,597,041 A | 8/1971 | Frantz | 350/72 |
| 3,741,634 A | 6/1973 | Stoltle | 351/57 |
| 4,077,703 A | 3/1978 | Pablo | 359/480 |
| 4,810,057 A | 3/1989 | Dunkley | 350/139 |
| 4,877,318 A | 10/1989 | Miles et al. | 350/569 |
| 4,953,766 A | 9/1990 | Cruickshank | 224/181 |
| 5,023,706 A | 6/1991 | Sandberg | 359/408 |
| 5,179,735 A | 1/1993 | Thomanek | 359/815 |
| 5,608,808 A | 3/1997 | Da Silva | 351/123 |
| 5,634,201 A | 5/1997 | Mooring | 455/90 |
| D386,298 S | 11/1997 | Hancock | D3/218 |
| 5,715,323 A | 2/1998 | Walker | 351/123 |
| 5,724,119 A | 3/1998 | Leight | 351/158 |
| 5,767,820 A | 6/1998 | Bassett et al. | 345/8 |
| 5,786,932 A | 7/1998 | Pniel | 359/409 |
| 5,828,437 A | 10/1998 | Hubert-Hubert et al. | 351/44 |
| 6,028,627 A | 2/2000 | Helmsderfer | 348/157 |
| 6,046,712 A | 4/2000 | Beller et al. | 345/8 |
| 6,115,846 A | 9/2000 | Truesdale | 2/209.13 |
| 6,160,666 A | 12/2000 | Rallison et al. | 359/630 |
| 6,172,808 B1 | 1/2001 | Foreman et al. | 359/481 |
| 6,247,205 B1 | 6/2001 | Damadian | 24/3.12 |
| 6,305,026 B1 | 10/2001 | Mo | 2/209.13 |
| 6,614,603 B1 * | 9/2003 | Himmele | 359/815 |
| 2005/0111097 A1* | 5/2005 | Iannarelli et al. | 359/409 |

* cited by examiner

*Primary Examiner*—Huy Mai
(74) *Attorney, Agent, or Firm*—Clifford Kraft

(57) ABSTRACT

A binocular assembly that includes a hands free support mechanism for supporting a lens element like a pair of binoculars in front of the user's eyes without using any use of the user's hands. The hands-free support mechanism can include an adjustable head securing strap, at least one positioning arm, a user tuneable radio, and at least one earphone. The binocular element can extend from a positioning arm or arms at an angle of from around zero to ninety-five degrees.

20 Claims, 1 Drawing Sheet

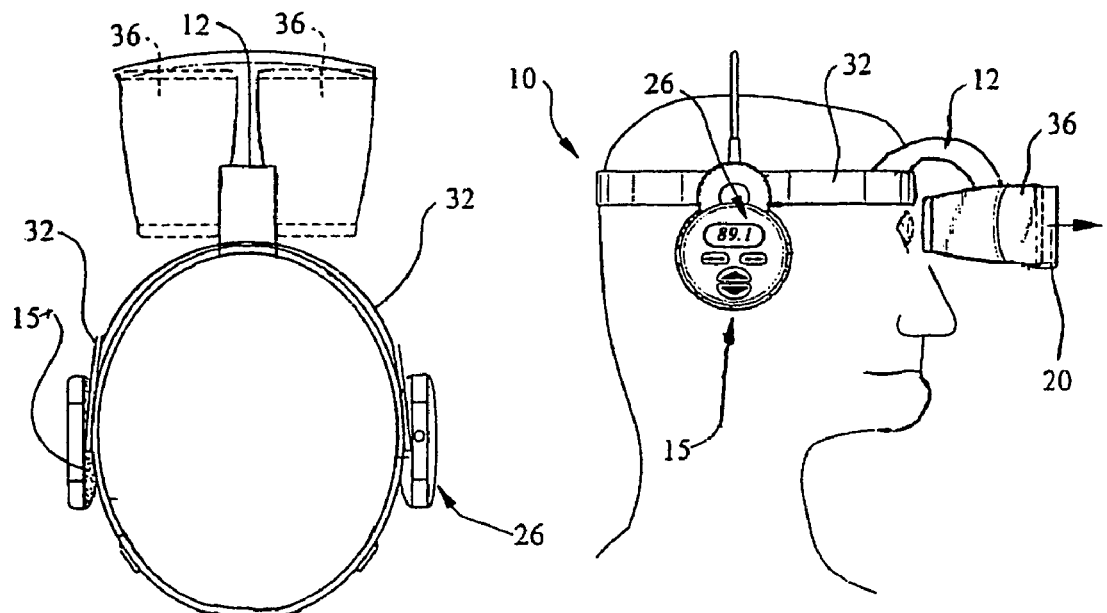
FIG. 1
FIG. 2
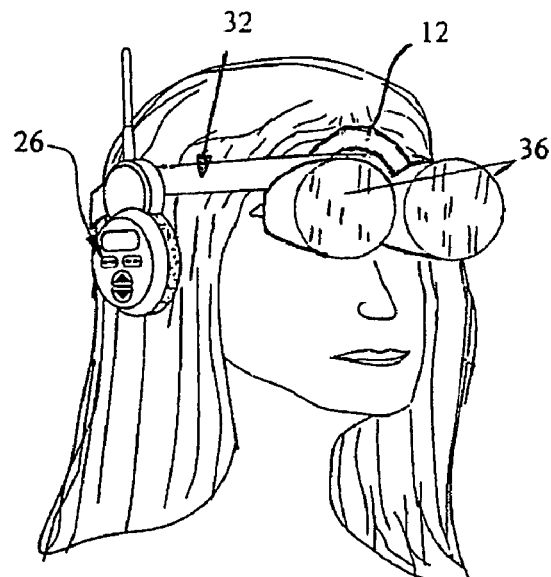
FIG. 3

SPORTS BINOCULAR ASSEMBLY

This application is a continuation in part of application Ser. No. 10/868,686 filed Jun. 15, 2004 now U.S. Pat. No. 7,031,068 which is a continuation in part of application Ser. No. 10/633,936 filed Aug. 4, 2003 now abandoned which was a continuation in part of application Ser. No. 10/117,989 filed Apr. 6, 2002, now U.S. Pat. No. 6,614,603 which was a continuation in part of application Ser. No. 09/523,213 filed Mar. 10, 2000, now U.S. Pat. No. 6,369,958. Application Ser. Nos. 10/868,686, 10/633,936, 10/117,989 and 09/523,213 are hereby incorporated by reference.

BACKGROUND

1. Field of the Invention

The present invention relates to sporting event viewing accessories and more particularly to a sports binocular viewing assembly that can include an adjustable head securing strap, a user tuneable radio with earphones, and a binocular assembly connected to the adjustable head securing strap by at least one positioning arm.

2. Description of the Prior Art

It is often desirable to use binoculars for better viewing the action while attending sporting events and the like. Although binoculars provide a useful mechanism for enhancing viewing of the event, they are often bothersome because the user must continuously dedicate at least one hand to supporting the binoculars. It would be a benefit, therefore, to have a binocular assembly that included a hands free support mechanism for supporting the binoculars in front of the user's eyes without using any of the user's hands.

SUMMARY OF THE INVENTION

It is an object of the invention to provide a sports binocular assembly that includes an adjustable head securing strap, a removable or fixed user tuneable radio with fixed or removable earphones, and a binocular assembly connected to the adjustable head securing strap by at least one positioning arm, the binocular assembly extending from the positioning arm or arms from an angle of around zero to around ninety-five degrees.

The present invention can optionally contain fixed or removable parts such as a camera, a zoom lens, an image stabilization system for camera/binocular elements, and a lens cover.

BRIEF DESCRIPTION OF THE DRAWINGS

FIG. 1 is a top view of an embodiment of the invention containing binocular elements, a user tuneable radio, headphones and optional lens cover.

FIG. 2 is a side view of the embodiment of FIG. 1.

FIG. 3 is a perspective view of the embodiment of FIG. 1.

DETAILED DESCRIPTION OF THE INVENTION

FIGS. 1–3 show views of an embodiment of the present invention containing a user tuneable radio and/or a digital music device 26. The adjustable headstrap 32, radio 26, earphones 15, and binocular elements 36 can be clearly seen. The earphones 15 can optionally be noise-canceling. The binocular elements can be optionally adjusted for each user's different eye width specifications. The radio 26 can have a volume control button and tuner frequency control button, as well as a station indicator display and optionally a microphone. The radio tuner can monitor any type of radio frequency signal and can be permanently, or removably, attached to the headstrap 32 assembly. The radio can contain a transmitter as well as a receiver. It is within the scope of the present invention to attach the radio 26 to the binocular elements 36. The positioning arm or arms 12 can hold binocular lenses 36 as well as an optional lens cover 20 that can protect the lenses. This lens cover 20 can be fixed or removably attached to the lens assembly or could mount on a hinge where it could be swung out of the binocular lens field when not in use. This lens cover can be optionally tinted for glare protection. An optional binocular focusing knob (not shown) can be mounted anywhere on the binocular assembly. It is also within the scope of the present invention to use a fixed binocular focusing mechanism without focus knob or mechanism or automatic focusing.

The present invention may also contain a removable, or fixed camera. The preferred embodiment of the invention normally has the camera located within the binocular lens assembly 36; however, it is within the scope of the invention to place the camera anywhere on the apparatus. The camera can be mechanical, electronic, or digital. A button can be placed anywhere on the apparatus to activate the camera and take a photo. It is also within the scope of the invention to use an electronic camera that can capture a series of images in succession, using a method generally known as progressive shutter capture. The electronic images can be stored in an electronic memory contained in the apparatus, or in a removable memory such as removable memory cards, or by any other storage means. The camera can also be an electronic camera with a remote button (a button not mounted on the apparatus) that causes it to take a photo or series of photos. The camera can be self-adjusting or manually adjusted.

A sports binocular assembly has been provided that can include an adjustable head securing strap, a user tuneable radio with earphones, and a binocular assembly connected to the adjustable head securing strap by at least one positioning arm, where the binocular elements can extend from the positioning arm or arms at an angle of from around zero to around ninety-five degrees.

The embodiment of the sports binocular assembly described here is of course subject to many different variations in structure, design, application and methodology. Because many varying and different embodiments may be made within the scope of the inventive concepts taught, and because many modifications may be made in the embodiments described, these variations and different embodiments are within the scope of the present invention.

I claim:

1. A sports binocular assembly comprising:
   an adjustable head securing strap;
   a user tuneable radio with earphones secured to said adjustable head securing strap; and,
   a binocular assembly connected to said adjustable head securing strap by at least one positioning arm, said binocular assembly extending from said positioning arm at an angle from around zero degrees to around ninety-five degrees.

2. The sports binocular assembly of claim 1 wherein said binocular assembly includes a zoom lens.

3. The sports binocular assembly of claim 1 wherein said radio is removable.

4. The sports binocular assembly of claim 1 wherein said earphones are removable.

5. The sports binocular assembly of claim 1 wherein said earphones are noise canceling.

6. The sports binocular assembly of claim 1 further comprising a camera attached to said binocular assembly.

7. The sports binocular assembly of claim 1 further comprising a digital music player.

8. The sports binocular assembly of claim 1 wherein said headstrap is self-adjusting.

9. The sports binocular assembly of claim 1 further comprising a lens cover.

10. The sports binocular assembly of claim 1 further comprising image stabilization for said binocular assembly.

11. The sports binocular assembly of claim 1 further comprising a microphone.

12. The sports binocular assembly of claim 1 further comprising a progressive shutter mode camera.

13. The sports binocular assembly of claim 1 wherein said binocular element is non-focusable.

14. A sports viewing apparatus comprising user adjustable binocular elements for viewing a sporting event, said apparatus including an adjustable head support for holding said binocular elements on a user's head, said viewing apparatus containing a user tuneable radio and at least one earphone coupled to said user tuneable radio.

15. A head-mounted viewing apparatus for allowing an event-participant to view the event in a hands-free manner, the apparatus comprising:
- a headstrap;
- a pivot arm coupled to said headstrap;
- a viewing element coupled to said pivot arm, said pivot arm pivoting between a lower viewing angle and an upper non-use angle;
- a removable camera coupled to said apparatus;
- a radio coupled to said apparatus, said radio having an antenna and tuner.

16. The apparatus of claim 15 wherein said headstrap is adjustable.

17. The apparatus of claim 15 further comprising an earphone electrically coupled to said radio.

18. The apparatus of claim 15 wherein said lower viewing angle is around zero degrees and said upper non-use angle is around ninety-five degrees.

19. The apparatus of claim 15 wherein said viewing element is a binocular lens assembly.

20. The apparatus of claim 19 further comprising a lens cover for said binocular lens assembly.

* * * * *